United States Patent [19]
Grimes

[11] Patent Number: 5,206,753
[45] Date of Patent: Apr. 27, 1993

[54] OPTICAL SWITCHING SYSTEM

[75] Inventor: Gary J. Grimes, Thornton, Colo.

[73] Assignee: AT&T Bell Laboratories, Murray Hill, N.J.

[21] Appl. No.: 738,407

[22] Filed: Jul. 31, 1991

[51] Int. Cl.$^5$ ............................................. H04J 14/02
[52] U.S. Cl. .................................... 359/128; 359/117; 359/139
[58] Field of Search ............... 359/123, 128, 135, 139, 359/158, 117, 118, 164, 147, 124; 385/16

[56] References Cited

U.S. PATENT DOCUMENTS 4,736,462  4/1988  Joel, Jr. ................................. 359/158
5,005,166  4/1991  Suzuki et al. ......................... 359/123

FOREIGN PATENT DOCUMENTS 0011494  1/1989  Japan ................................... 359/123

OTHER PUBLICATIONS

N. K. Ailawadi et al., "Broadband Photonic Switching Using Guided-Wave Fabrics", IEEE LTS, May 1991, vol. 2, No. 2, pp. 38–43.

Primary Examiner—Edward L. Coles, Sr.
Assistant Examiner—Kinfe-Michael Negash
Attorney, Agent, or Firm—John C. Moran

[57] ABSTRACT

An optical switching unit requiring no optical-to-electrical conversions on optical data paths being switched through the optical switching unit. The optical switching unit receives optical data information from one terminal and switches it to another terminal. The optical switching unit frame synchronizes the data transmission timing of the terminals in accordance with the data transmission timing of the optical switching unit. This frame synchronization eliminates the need to provide data buffering and frame synchronization in the optical switching unit. The optical switching unit comprises an optical network, system clock, optical input interfaces for receiving information from terminals, and optical output interfaces for transmitting information to terminals. The system clock determines the timing of each terminal using information transmitted to an optical input interface by the terminal. If the timing of a terminal does not match that of the system clock, the system clock blocks the transfer of data information by the optical input interface to the optical network and transmits timing information to the terminal via an optical output interface. If the timing matches, the system clock signals the optical input interface to communicate the data information to the optical network which switches the data information to optical output interfaces for transmission to terminals.

14 Claims, 4 Drawing Sheets

OPTICAL SWITCHING SYSTEM

TECHNICAL FIELD

This invention relates to the switching of data and, in particular, to the optical switching of data.

BACKGROUND OF THE INVENTION

Prior art optical switching systems that utilize time division multiplexing require electrical interfaces at the inputs and outputs of an optical switch. The input interfaces receive optical data from optical links, convert the optical data to electrical data, buffer and synchronize the electrical data, and convert the electrical data to optical data for switching by the optical switch. The output interfaces perform the same function but in the reverse order. One such prior art optical switching system is set forth in the article entitled "Broadband Photonic Switching Using Guided-Wave Fabrics", IEEE LTS Journal, N. K. Ailawadi, et al., May 1991, Vol. 2, No. 2, p. 36-43.

The electrical buffering and synchronizing on the inputs and outputs of the optical switch insures that data is transmitted and received in the correct time slots in relation to the timing of the optical switching system. The need for such interfaces is unfortunate since present optical switching technology allows for nearly unlimited bandwidth on optical communication paths through an optical switch. However, these paths are relatively expensive, making time division multiplexing highly desirable so that multiple channels can share a common path. Further, the need for electronic buffering detracts from the advantages of an optical switch because generally data which can be electronically buffered, stored and synchronized to accomplish the time division multiplexing within the switching system can also be electronically switched within an electronic switching system at the same rate as the buffering.

SUMMARY OF THE INVENTION

The forementioned problem is solved and a technical advance is achieved in the art by an optical switching unit and a method that require no optical-to-electrical conversions on optical data paths being switched through the optical switching unit. The optical switching unit receives optical data information from one terminal and switches it to another terminal. In addition, the optical switching unit synchronizes the data transmission timing of the terminals in accordance with the data transmission timing of the optical switching unit. This synchronization eliminates the need to provide data buffering and synchronizing in the optical switching unit.

In an illustrative embodiment, the optical switching unit comprises an optical network, system clock, optical input interfaces for receiving information from the terminals, and optical output interfaces for transmitting information to the terminals. The system clock determines the timing of each terminal using information transmitted to an individual optical input interface by each terminal. If the timing of a terminal does not match that of the system clock, the system clock blocks the transfer of data information by the optical input interface to the optical network and transmits corrective timing information to the terminal via an optical output interface. If the timing matches, the system clock signals the optical input interface to communicate the data information to the optical network which switches the data information to optical output interfaces for transmission to terminals.

Timing information and data information are communicated with terminals using different optical wavelengths. An optical input interface separates these two optical wavelengths for use by the optical switching unit; whereas, an optical output interface combines these wavelengths for transmission to a terminal.

Other and further aspects of the present invention will become apparent during the course of the following description and by reference to the accompanying drawing.

DETAILED DESCRIPTION

Figure 1:
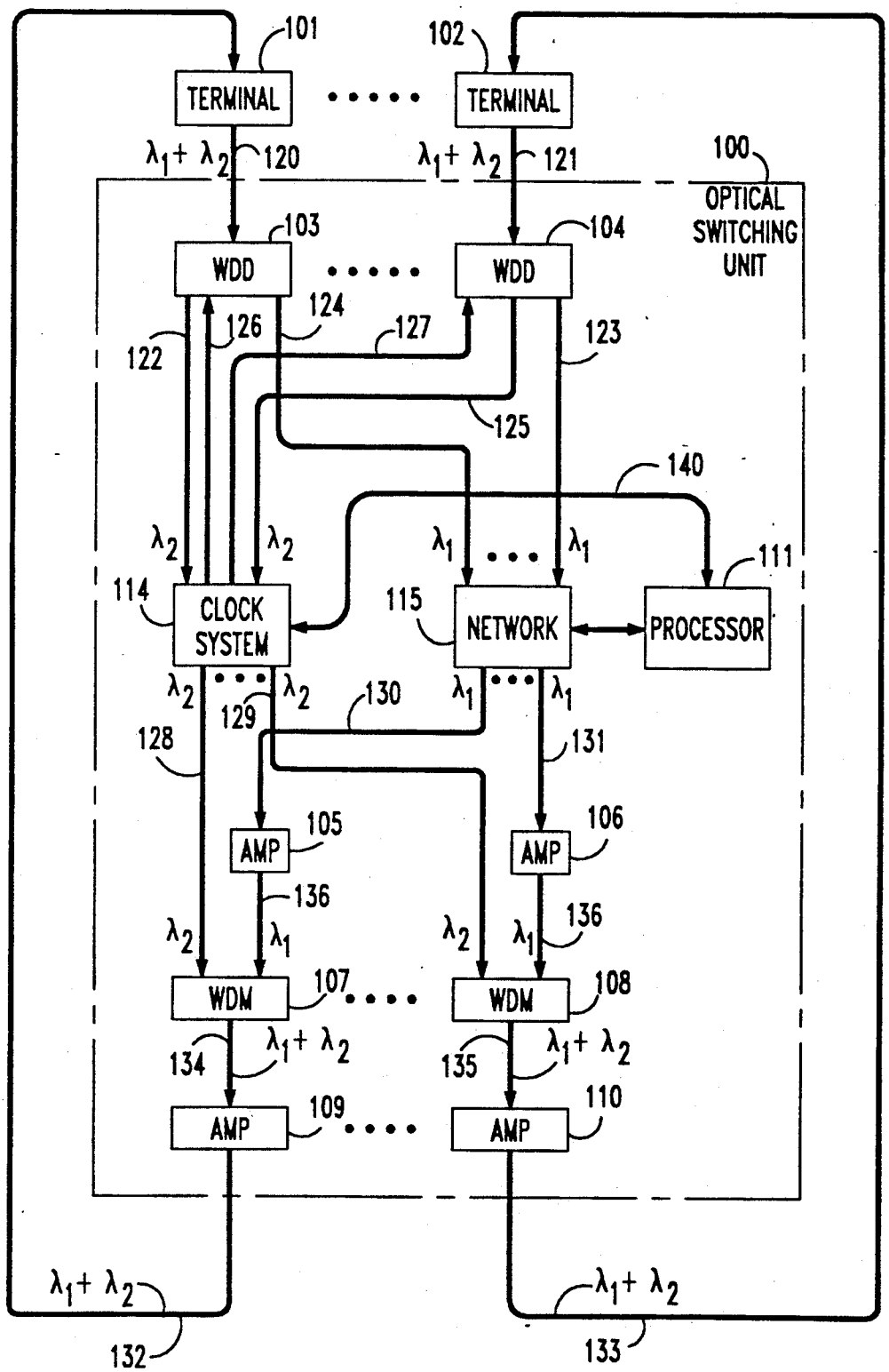
FIG. 1 illustrates, in block diagram form, an optical switching unit with attached terminals embodying the inventive concept.

FIG. 1 illustrates terminals 101 through 102 connected to optical switching unit 100 via input optical links 120 through 121 and output optical links 132 through 133, respectively. In accordance with the invention, transmission of data signals from one terminal to other terminals through optical switching unit 100 is done entirely by optical devices, and the data signals are never converted to electrical signals. Optical links 120 through 121 and 131 through 133 are capable of carrying two optical wavelengths, each being a separate logical path. Optical switching unit 100 optically communicates data information among terminals 101 through 102 using time division multiplexing techniques. For example, terminal 101 transmits optical signals using wavelengths $\lambda_1$ and $\lambda_2$ on optical link 120 and receives optical signals over path 132 using the same wavelengths. Wavelength $\lambda_1$ is used to designate the data optical wavelength used for transmission of data signals, and $\lambda_2$ is used to designate the timing optical wavelength used for transmission of timing control information within the optical switching system.

The two optical wavelengths transmitted from terminal 101 via optical link 120 are received by wavelength division demultiplexer (WDD) 103 which is an optical input interface. Wavelength division demultiplexer 103 separates the two optical wavelengths and applies data optical wavelength $\lambda_1$ to optical switch network 115. The timing optical wavelength $\lambda_2$ is applied to the clock system 114 via optical path 122. Clock system 114 uses information communicated via timing optical wavelength $\lambda_2$ to determine if terminal 101 is in frame synchronization with clock system 114. If terminal 101 is in frame synchronization, clock system 114 enables wavelength division demultiplexer 103 to communicate the data optical wavelength $\lambda_1$ from input optical link 120 to network 115. If terminal 101 is not in frame synchronization, clock system blocks the communications of data optical wavelength $\lambda_1$ through wavelength division demultiplexer 103 and transmits control information via wavelength division multiplexers (WDMs) blocks 107 and 108 and output optical link 132 to terminal 101 to frame synchronize terminal 101. Frame synchronization is described in greater detail with respect to FIG. 2.

Each terminal receives and transmits a frame of time slots. The terminal extracts data from time slots assigned to the terminal by processor 111 and transmits data in time slots of the frame also assigned to the terminal using well known techniques. Network 115 is of the time division multiplexing type which is well known to those skilled in the art, operating under control of processor 111 in a conventional manner, takes data in particular time slots from particular terminals and switches that data into time slots assigned to terminals designated to receive the data. Time slot assignment information is transmitted to the terminals by processor 111 via bus 140 and clock system 114 in the timing optical wavelength $\lambda_2$.

Network 115 may be advantageously fabricated using lithium niobate devices. Alternatively, other optical switching devices may be used to fabricate network 115 including self electro-optic effect devices (commonly known as "SEED" devices), ferroelectric liquid crystal devices, magneto-optical devices, moving fiber type switches, or any other optical switching technology. Advantageously, the switching network could also be a passive combiner with the switching being effected by making each terminal respond to one or more time slots.

Terminal 102 transmits optical wavelengths, $\lambda_1$ and $\lambda_2$ via optical path 121 to wavelength demultiplexer 104. Wavelength division demultiplexer 104 separates the two optical wavelengths $\lambda_1$ and $\lambda_2$ and applies data optical wavelength $\lambda_1$ to optical network 115 via optical path 123 and applies timing wavelength optical $\lambda_2$ to the clock system 114 via optical path 125. Wavelength division demultiplexers 103 and 104 contain optical shutters for blocking all data optical wavelength $\lambda_1$ information from being applied to the network 115 when the frame timing of a terminal is determined to be incorrect by clock system 114. As noted earlier, when clock system 114 finds a given timing optical wavelength $\lambda_2$ input from a wavelength division demultiplexer to be in frame synchronization with the system clock, clock system 114 allows the data optical wavelength $\lambda_1$ to be applied from that wavelength division demultiplexer over an optical path to network 115.

The transmission of information to the terminals is described in this paragraph. Clock system 114 applies an optical timing control signal via timing optical wavelength $\lambda_2$ over optical path 128 to wavelength division multiplexer 107. The data from network 115 is communicated by the data optical wavelength $\lambda_1$ via optical path 130 to optical amplifier 105. This wavelength is amplified by optical amplifier 105 and applied to optical path 136 where it is received by wavelength division multiplexer 107. Wavelength division multiplexer 107 combines the two optical wavelengths from paths 136 and 128 to form a composite optical signal which is transmitted via path 134 to optical amplifier 109. Optical amplifier 109 amplifies both wavelengths and transmits the composite optical signal, designated by $\lambda_1 + \lambda_2$, via path 132 to the terminal 101. Wavelength division multiplexer 107 and optical amplifier 109 form an optical output interface. Blocks 106, 108, and 110 function in a similar manner.

To frame synchronize the terminals, clock system 114 receives frame clock information from the terminals via timing optical wavelength $\lambda_2$ and determines if the frame timing of an incoming timing signal from a given terminal is in phase within a predetermined range of the master clock within the clock system 114. This determination also allows clock system 114 to compensate for delays along the optical paths, particularly links 120 through 121 and 132 through 133, which tend to be longer and more variable than internal optical paths of optical switching unit 100. If the frame timing is in phase, clock system 114 allows the data (transported via the data optical wavelength $\lambda_1$) to be applied immediately to network 115 by the actuation of the optical shutter of the appropriate wavelength division multiplexer and signals the terminal not to adjust its frame timing. If the frame timing is not in phase, clock system 114 signals via the timing optical wavelength $\lambda_2$ that the terminal is to advance or delay frame timing. This signaling allows the terminal to become frame synchronized with the master clock of the clock system 114. In accordance with the invention, all frames and time slots applied to network 115 are frame synchronized and do not require any electrical buffering, additional frame synchronization, or rate conversion. Advantageously, this allows network 115 and the entire optical switching system to be transparent to data rates over a wide range. The result is that each time slot assigned to an individual terminal may carry the data at arbitrary rates and have either analog or digital format. Allowing users of optical switching system to arbitrarily change the data rates and formats as terminal technology permits.

Figure 2:
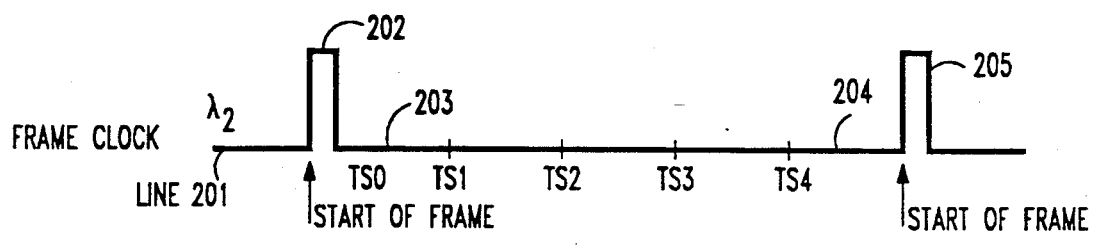
FIG. 2 illustrates the manner in which data and timing information is communicated between the optical switching unit and the terminals.
Figure 2:
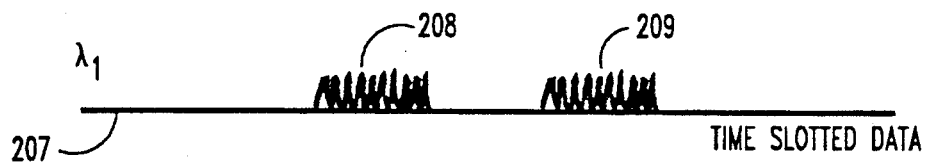
Figure 2:
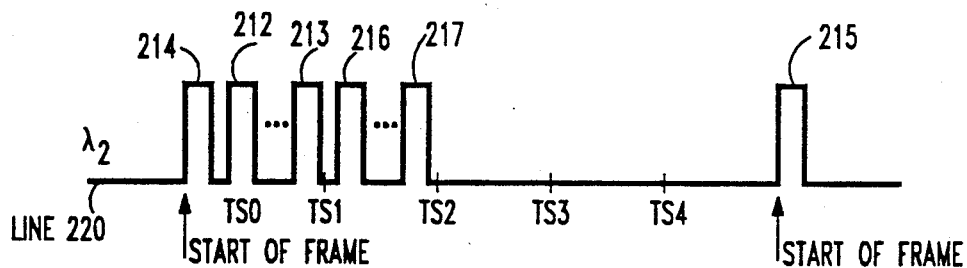
Figure 2:
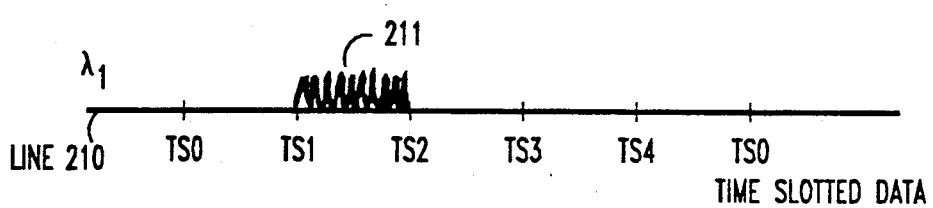

In order to understand the operation of clock system 114, consider FIG. 2 which illustrates signals of frames that are transmitted and received by terminal 101. On line 201 of FIG. 2, the rising edge of pulses 202 and 205 designates the start of frames at the output of terminal 101 on timing optical wavelength $\lambda_2$ of link 120. Time slot 0, designated as 203, appears immediately after the pulse 202 and successive time slots are shown up to time slot 4, designated as 204, which is followed by pulse 205 designating a start of a new frame. Pulses 202 and 205 are generated by terminal 101 and indicate the internal timing of the terminal 101. The time slotted data from terminal 101 (transmitted via data optical wavelength $\lambda_1$ of link 120) is illustrated by line 207 of FIG. 2. This time slotted data may be computer data, video data, voice data, a facsimile data, or any kind of analog or digital data. In line 207, for example, time slot 1, designated as 208, and time slot 3, designated as 209, are in active use by terminal 101.

Line 210 of FIG. 2 shows the data signal communicated to terminal 101 via path 132 from network 115. Time slots are transmitted and distinguished from one another using techniques well known in the art. Time slot 1 is active and the other times slots are inactive. Corresponding to line 210 is line 220 which illustrates the timing control signals from the clock system 114 having pulses 214 and 215 which designates the start of frames and having digitally encoded phase error information designated by bits 212 through 213 in time slot 0. In addition, bits 216 through 217 in time slot 1 contain information assigning time slots as determined by processor 111. When pulses 214 and 215 are received by terminal 101, they are distinguished from digitally encoded phase error bits 212 through 213 using techniques well known in the art.

Figure 3:
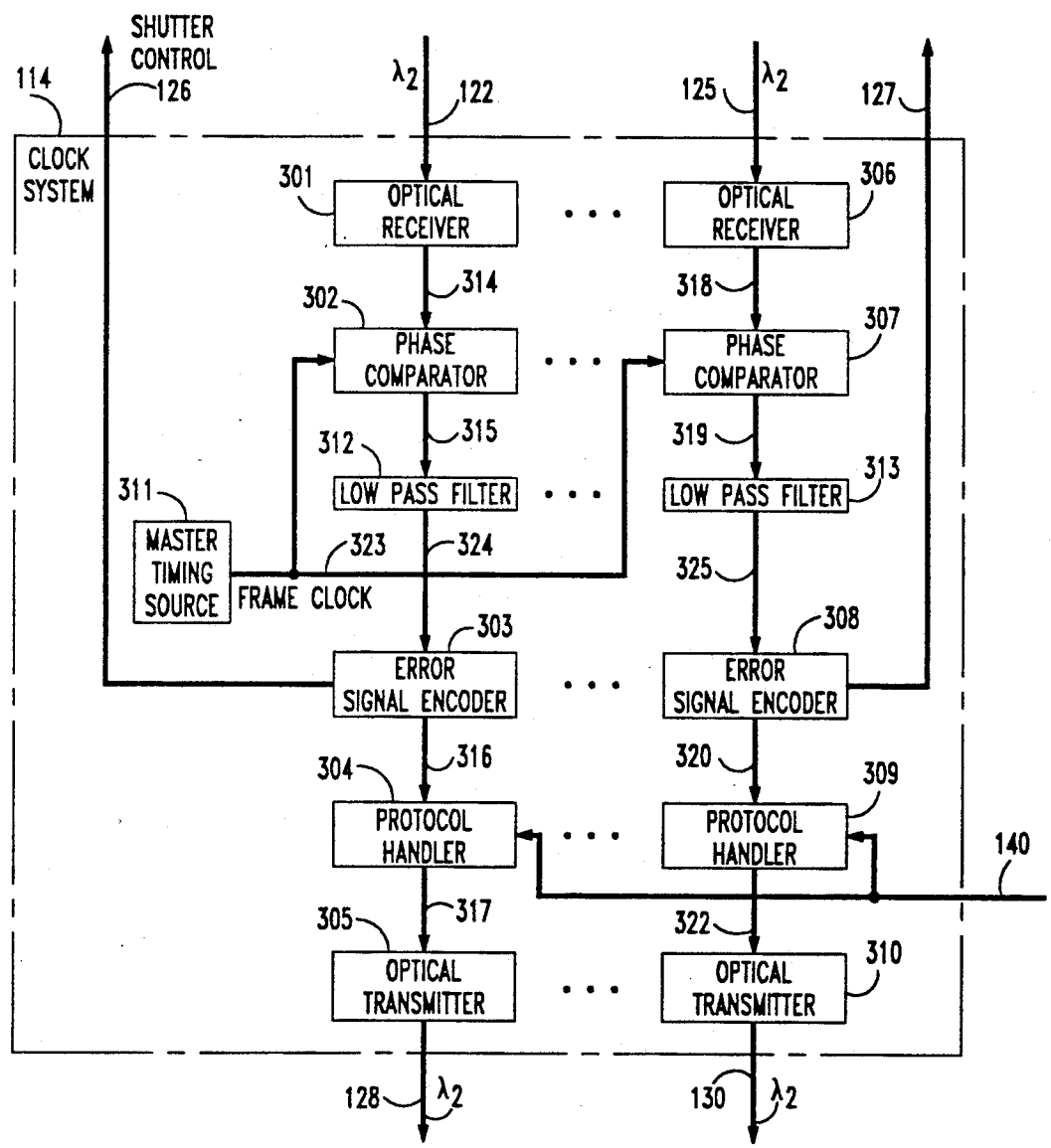
FIG. 3 illustrates, in block diagram form, the clock system of the optical switching unit.

The details of clock system 114 are shown in FIG. 3. Master timing source 311 of clock system 114 is advantageously a precision tuneable quartz crystal oscillator or phase locked loop that can lock its frequency to that of an incoming signal of a precision digital facility (which is not illustrated) using well known techniques. The frame timing control information from terminal 101 is received by the clock system 114 over optical path 122 via timing optical wavelength $\lambda_2$. This information is converted from an optical signal to an electrical signal by optical receiver 301 and applied via path 314 to phase comparator 302. Phase comparator 302 compares the phase of the frame signal received from terminal 101 with the phase of the frame signal received from master timing source 311 via path 323. Phase comparator 302 produces an electrical signal which is an analog signal proportional to the phase difference between the signals received via paths 314 and 323 using techniques well known in the art. This analog signal is applied via path 315 to low pass filter 312 where it is filtered and applied to error signal encoder 303 via path 324.

Error signal encoder 303 converts the analog signal received via path 324 into a digital representation. Error signal encoder 303 also generates an optical shutter control signal that is transmitted via optical path 126 to wavelength division demultiplexer 103 for the purposes of gating the data optical wavelength $\lambda_1$ from wavelength demultiplexer 103 to network 115 in the following manner. If the analog signal received by error signal encoder 303 via path 324 is smaller than some predefined value, this means that terminal 101 is frame synchronized and error signal encoder 303 signals via path 126 to wavelength division demultiplexer 103 to allow the data optical wavelength $\lambda_1$ to be transmitted to network 115 via path 124. On the other hand, if the analog signal received by error signal encoder 303 via path 324 is larger than the predefined value, this means that terminal 101 is out of frame synchronization and error signal encoder 303 signals via path 126 to wavelength division demultiplexer 103 to block the data optical wavelength $\lambda_1$ from network 115.

If terminal 101 is out of frame synchronization, control information is sent to terminal 101 as described in this paragraph. Error signal encoder 303 communicates the digital representation of the analog signal it receives over path 324 to protocol handler 304 via path 316. Protocol handler 304 formats this digital representation from error signal encoder 303. In addition, protocol handler 304 also formats the time slot assignment information received from processor 111 via bus 140 and combines this information with the information from error signal encoder 303. The combined information is formatted for serial transmission over optical path 128 after it is converted from electrical to optical form (timing optical wavelength $\lambda_2$) by means of optical transmitter 305. Blocks 306 through 310 and 313 perform similar processing between optical input path 125 and optical output path 130, and a similar assemblage of components would be associated with each of the other terminals.

Figure 4:
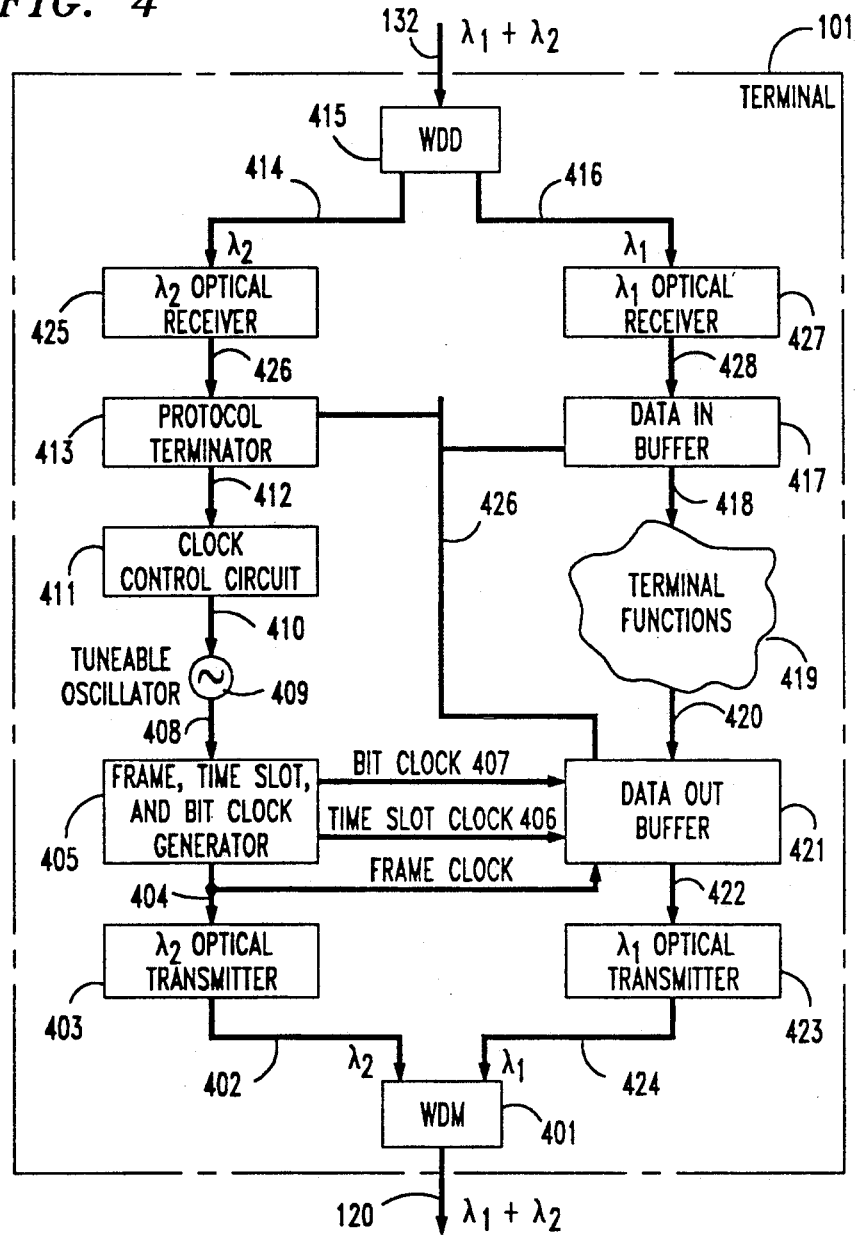
FIG. 4 illustrates, in block diagram form, a terminal embodying the inventive concept.

FIG. 4 shows the details of terminal 101. The combination of optical wavelengths $\lambda_1$ and $\lambda_2$ is applied to terminal 101 via path 132 from which they are received by wavelength division demultiplexer 415. Here, the wavelengths $\lambda_1$ and $\lambda_2$ are separated and transmitted on separate optical paths by demultiplexer 415. The timing optical wavelength $\lambda_2$ is applied to optical receiver 425 via path 414. Optical receiver 425 converts the timing optical wavelength $\lambda_2$ to an electrical signal which is applied to protocol terminator 413 via path 426. Protocol terminator 413 terminates the protocol which may advantageously be X.25, HDLC, or a similar bit-oriented protocol and extracts the digitally encoded phase error signal and the time slot assignment information. The latter information is transmitted to data in buffer 417 and data out buffer 421 via bus 426. The digitally encoded phase error signal is applied via path 412 to clock control circuit 411. The latter circuit changes the digitally encoded phase error signal to an analog voltage which controls voltage tuneable oscillator 409.

The output of the oscillator is applied over path 408 to frame, time slot and bit clock generator 405 in order to adjust the latter generator. Generator 405 produces three clock signals: frame clock, time slot clock, and bit clock. Generator 405 applies the frame clock signals via path 404 to $\lambda_2$ optical transmitter 403. Optical transmitter 403 receives the frame clock signal and converts it into an optical signal on timing optical wavelength $\lambda_2$ which is applied via path 402 to wavelength division multiplexer 401. Additionally, the frame clock, time slot clock, and bit clock signals are applied to data out buffer 421 over paths 404, 406, and 407.

Now consider the data processing functions of terminal 101, as illustrated in FIG. 4. Wavelength division demultiplexer 415 applies the data signals (communicated via data optical wavelength $\lambda_1$) to data in buffer 417 via path 416, optical receiver 427, and path 428. In response to time slot assignment information from protocol terminator 413, data in buffer 417 makes the data available to terminal functions 419 via path 418. Terminal functions 419 performs the functions of terminal 101. For example, if the terminal is an ordinary computer terminal attached to a host, the received data would be displayed on the screen of the terminal, and the output of the terminal functions 419 would be the output of the keyboard which is sent back to the host. Terminal functions 419 applies its output via path 420 to data out buffer 421. Data out buffer 421 uses the frame clock, time slot clock, and bit clock signals to synchronize the output data for transmission via path 422 and the time slot assignment information from protocol terminator 413 to determine assigned time slots. If the output data is in analog form, only the frame and time slot clocks are required. Optical transmitter 423 changes the electrical signal received via path 422 into an optical data signal for communication by data optical wavelength $\lambda_1$. Data optical wavelength $\lambda_1$ is transmitted via optical path 424 to wavelength division multiplexer 401 where it is combined with the timing optical wavelength $\lambda_2$ which is received via path 402. Wavelength division multiplexer 401 combines the optical wavelengths into a composite optical signal $\lambda_1 + \lambda_2$ containing both optical wavelengths $\lambda_1$ and $\lambda_2$. This composite optical signal $\lambda_1 + \lambda_2$ is applied via optical link 120 to wavelength division demultiplexer 103 of FIG. 1.

Figure 5:
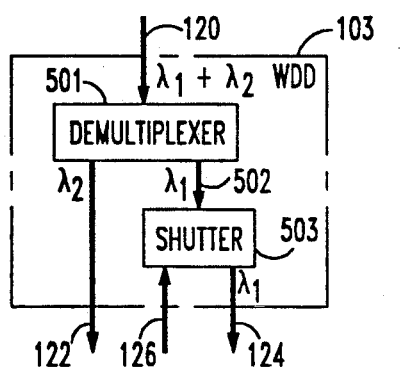
FIG. 5 illustrates, in block diagram form, a wavelength division demultiplexer of the optical switching unit.

The details of wavelength division demultiplexer 103 are shown in FIG. 5. Demultiplexer 501 receives an optical signal which is the composite optical signal $\lambda_1 + \lambda_2$ over link 120. Demultiplexer 501 may advantageously be implemented using focusing gratings or may be implemented using a number of other optically dispersive techniques. All such techniques are well known in the art. The separated timing optical wavelength $\lambda_2$ is applied via path 122 to clock system 114 of FIG. 1. The data optical wavelength $\lambda_1$ is applied via path 502 to optical shutter 503. The purpose of the shutter is to prevent network 115 from receiving non-synchronized data sent from terminals 101 before terminal 101 is frame synchronized with the optical switching system. Advantageously, if network 115 is a simple passive combiner, another purpose of the shutter 503 is to prevent a terminal from destroying data in network 115 when the terminal is not frame synchronized properly with respect to the frame and time slots of the other terminals in the optical switching system. The shutter control signal is received via path 126 from the clock system 114 as shown in FIG. 1. The shutter control signal applied over path 126 may be electrical or optical depending on the shutter. Shutters of this type are well known in the art.

Additionally, the circuitry disclosed herein is, of course, merely illustrative. Indeed, although the various functional blocks disclosed herein are depicted as discrete circuitries, those various functions could be carried out using one or more programmed processors or digital signal processing (DSP) chips.

It is to be understood that the above-described embodiments are merely illustrative of the principles of the invention and that other arrangements may be devised by those skilled in the art without departing from the spirit or scope of the invention. In particular, all optical paths in this invention may be free space optical paths or optical fibers. In addition, other optical networks may be readily devised by those skilled in the art.

I claim:

1. An optical system having all optical communication paths for communication of data, comprising:
   a plurality of terminals;
   a plurality of optical links;
   an optical switching unit for providing all optical communication paths between one of said plurality of terminals and another one of said plurality of terminals via said optical links;
   means physically located with said optical switching unit and interconnected to said plurality of optical links responsive to information transmitted via said optical links from said plurality of terminals for synchronizing the internal timing of said plurality of terminals with that of said optical switching unit; and
   said synchronizing means comprises means for blocking data information from one of said plurality of terminals not in synchronization with said optical switching unit from being switched by said optical switching unit.

2. The optical system of claim 1 wherein said synchronizing means further comprises means responsive to timing information from said one of said plurality of terminals for adjusting said one of said plurality of terminals to be in synchronization with said optical switching unit.

3. The optical system of claim 2 wherein said optical switching unit comprises a plurality of input optical interfaces each terminating one of said optical links and a plurality of output optical interfaces each terminating one of said optical links.

4. The optical switching system of claim 3 wherein timing information to adjust the timing of said plurality of terminals is communicated via said optical links by a first optical wavelength and data information is communicated via said optical links by a second optical wavelength.

5. The optical switching system of claim 4 wherein each of said plurality of optical input interfaces comprises means for separating said first optical wavelength and said second optical wavelength.

6. An optical switching unit for interconnecting terminals via a plurality of input optical links and a plurality of output optical links, comprising:
   a plurality of optical input interfaces each connected to one of said plurality of input optical links and;
   a plurality of optical output interfaces each connected to one of said plurality of output optical links;
   an optical network for interconnecting one of said plurality of optical input interfaces and one of said plurality of optical output interfaces to create an all optical communication path through said one of said plurality of optical input interfaces and said one of said plurality of optical output interfaces and said optical network;
   means physically located with said optical network and interconnected to said plurality of optical links responsive to information received from each of said terminals for synchronizing the timing of each of said terminals with that of said optical switching unit via said plurality of output optical links
   said synchronizing means comprises means for determining the timing of said terminals via said plurality of input optical links; and
   means responsive to determination of incorrect timing for adjusting the timing of said terminals via said plurality of output optical links.

7. The optical switching unit of claim 6 wherein timing information to adjust the timing of said terminals is communicated by a first optical wavelength and data information is communicated by a second optical wavelength.

8. The optical switching unit of claim 7 wherein each of said plurality of optical input interfaces comprises means for separating said first optical wavelength and said second optical wavelength; and
   means responsive to determination of incorrect timing for blocking said second optical wavelength from said optical network.

9. The optical switching unit of claim 8 wherein each of said plurality of optical output interfaces comprises means for combining said first optical wavelength and said second optical wavelength.

10. A method for controlling an optical system having all optical communication paths for communication of data and said optical system having a plurality of terminals, a plurality of optical links, an optical switching unit and a synchronizing unit physical located with said optical switching unit and interconnected to said plurality of optical links, said method comprising the steps of:
    providing all optical communication paths through said optical switching unit between one of said plurality of terminals and another one of said plurality of terminals via said optical links;
    synchronizing the internal timing of said plurality of terminals with that of said optical switching unit in response to information transmitted via said optical links from said plurality of terminals; and
    blocking data information from one of said plurality of terminals not in synchronization with said optical switching unit from being switched by said optical switching unit.

11. The method of claim 10 wherein said synchronizing step further comprises the step of adjusting said one of said plurality of terminals to be in synchronization with said optical switching unit in response to timing information from said one of said plurality of terminals.

12. The method of claim 11 wherein said optical switching unit comprises a plurality of input optical interfaces each terminating one of said optical links and a plurality of output optical interfaces each terminating one of said optical links.

13. The method of claim 12 wherein said step of adjusting comprises the step of communicating timing information to adjust the timing of said plurality of terminals by a first optical wavelength; and said step of providing comprises the step of communicating data information via said optical links by a second optical wavelength.

14. The method of claim 13 further comprises the step of separating said first optical wavelength and said second optical wavelength by each of said plurality of optical input interfaces.

* * * * *